United States Patent [19]

Fickelscher

[11] Patent Number: 4,744,678

[45] Date of Patent: May 17, 1988

[54] ARRANGEMENT WITH ROLLER ELEMENTS

[75] Inventor: Kurt G. Fickelscher, Frankenthal, Fed. Rep. of Germany

[73] Assignee: Delta-Drive, Technik nach dem Gleitkeilprinzip GmbH, Frankenthal, Fed. Rep. of Germany

[21] Appl. No.: 937,503

[22] Filed: Dec. 3, 1986

[30] Foreign Application Priority Data

Dec. 4, 1985 [DE] Fed. Rep. of Germany ....... 3542776
Jun. 11, 1986 [DE] Fed. Rep. of Germany ....... 3619561

[51] Int. Cl.$^4$ .................................................. F16C 19/49
[52] U.S. Cl. ............................... 384/461; 384/565; 384/572
[58] Field of Search ............... 384/461, 572, 573, 565, 384/58, 586

[56] References Cited

U.S. PATENT DOCUMENTS

| 2,128,641 | 4/1964 | Musser . | |
|---|---|---|---|
| 2,344,078 | 3/1944 | Brissonnet et al. . | |
| 2,417,398 | 3/1947 | Rundt . | |
| 2,976,089 | 3/1961 | Vogt | 384/58 |
| 2,981,568 | 4/1961 | Wise | 384/573 |
| 3,058,788 | 10/1962 | Kaplan | 384/565 |
| 3,060,767 | 10/1962 | Parrett . | |
| 3,410,614 | 11/1968 | Shaw | 384/573 |
| 4,109,977 | 8/1978 | Staphan . | |
| 4,235,128 | 11/1980 | Kanervo et al. . | |
| 4,514,156 | 4/1985 | Sakamaki et al. . | |

FOREIGN PATENT DOCUMENTS

| 23359 | 3/1906 | Austria . |
|---|---|---|
| 537153 | 4/1955 | Belgium . |
| 142669 | 5/1985 | European Pat. Off. . |
| 196861 | 2/1907 | Fed. Rep. of Germany . |
| 339650 | 9/1919 | Fed. Rep. of Germany . |
| 521075 | 3/1931 | Fed. Rep. of Germany . |
| 532050 | 8/1931 | Fed. Rep. of Germany . |
| 1234455 | 11/1962 | Fed. Rep. of Germany . |
| 354402 | 11/1965 | Fed. Rep. of Germany . |
| 2332897 | 1/1975 | Fed. Rep. of Germany . |
| 2622457 | 11/1977 | Fed. Rep. of Germany . |
| 2903200 | 7/1980 | Fed. Rep. of Germany . |
| 2923871 | 12/1980 | Fed. Rep. of Germany . |
| 3216010 | 11/1983 | Fed. Rep. of Germany . |
| 3418621 | 11/1985 | Fed. Rep. of Germany . |
| 398334 | 6/1909 | France . |
| 1286068 | 1/1962 | France . |
| 1548031 | 10/1968 | France . |
| 2076180 | 10/1971 | France . |
| 137278 | 6/1920 | United Kingdom . |
| 186999 | 10/1922 | United Kingdom . |
| 266768 | 3/1927 | United Kingdom . |

OTHER PUBLICATIONS

Charles Agnoff, "Bearings", *Machine Design*, Aug. 31, 1967, pp. 98-103.
AKT Catalog, May 6, 1974.
The Hollow Roller Bearing, Transactions of the ASME, vol. 102, No. 152, pp. 222-227 1980.

*Primary Examiner*—Lenard A. Footland
*Attorney, Agent, or Firm*—Foley & Lardner, Schwartz, Jeffery, Schwaab, Mack, Blumenthal & Evans

[57] ABSTRACT

An arrangement of roller elements which are guided by means of a guide ring and are arranged between two support rings in which, to reduce the coefficient of friction, deformations are allowed in order to eliminate slippage and decrease friction. The roller elements are each rotatably mounted on and/or by a shaft, and the guide ring is formed to be resilient or yieldable, so that the guide elements can make movements relative to each other. The arrangement is primarily designed as a radial bearing or an axial bearing and can additionally be designed as a frictional drive or transmission.

20 Claims, 22 Drawing Sheets

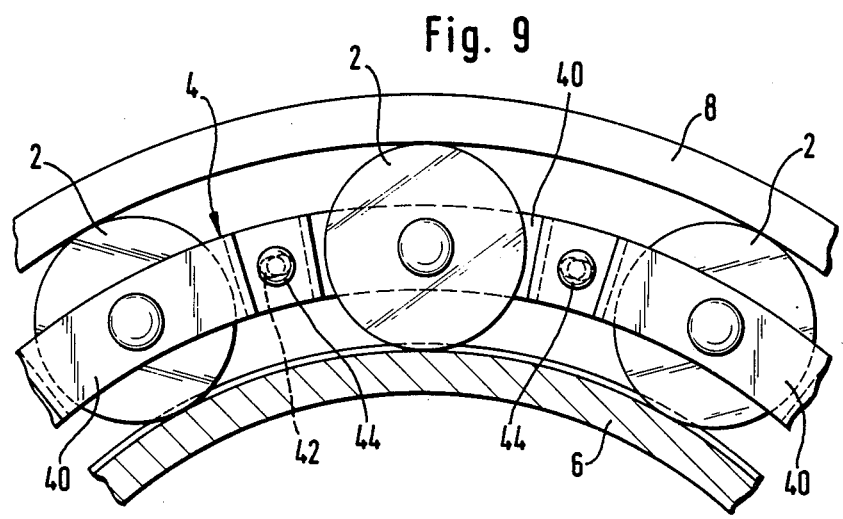
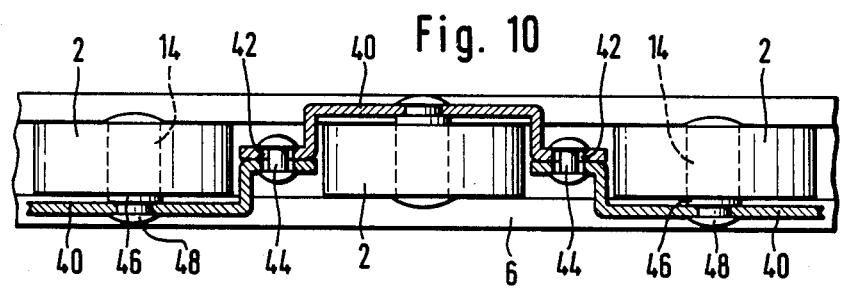
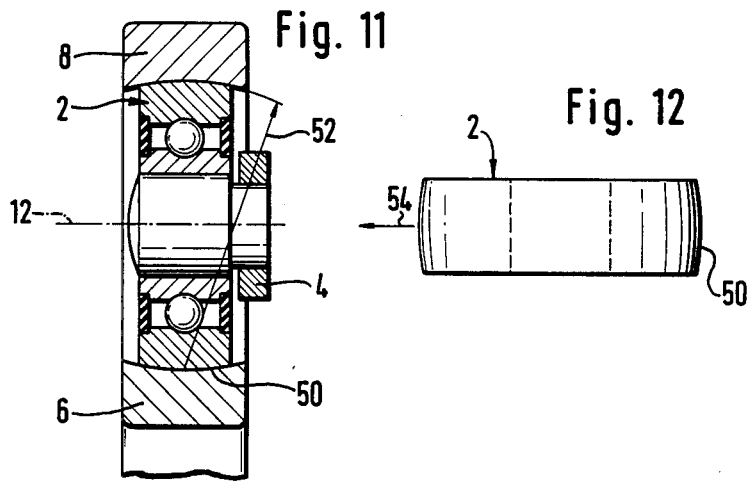

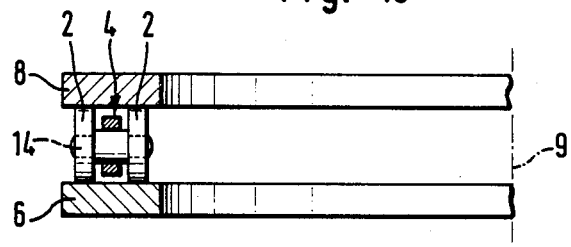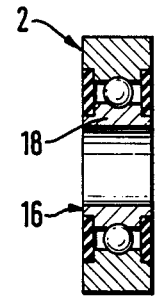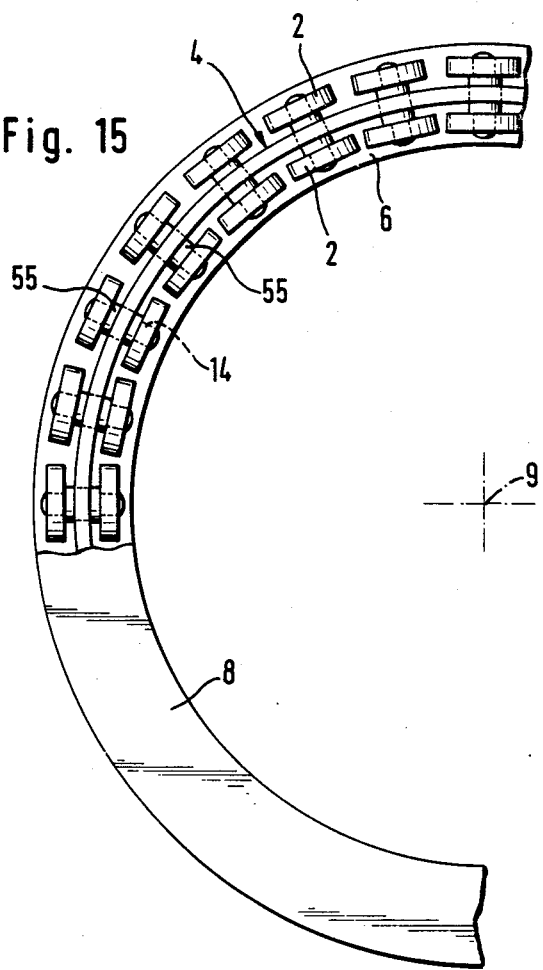

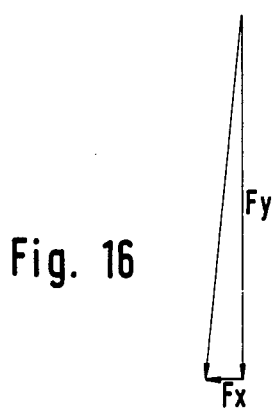
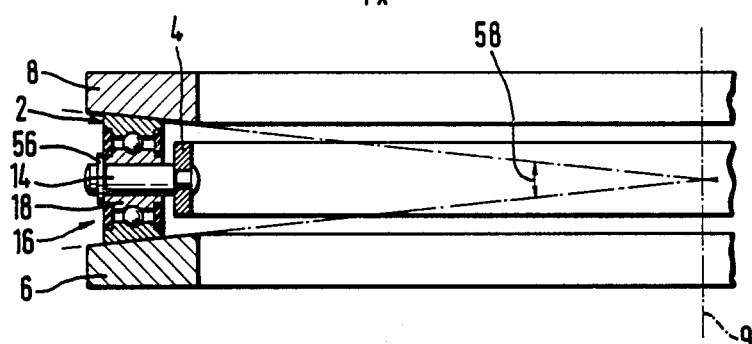
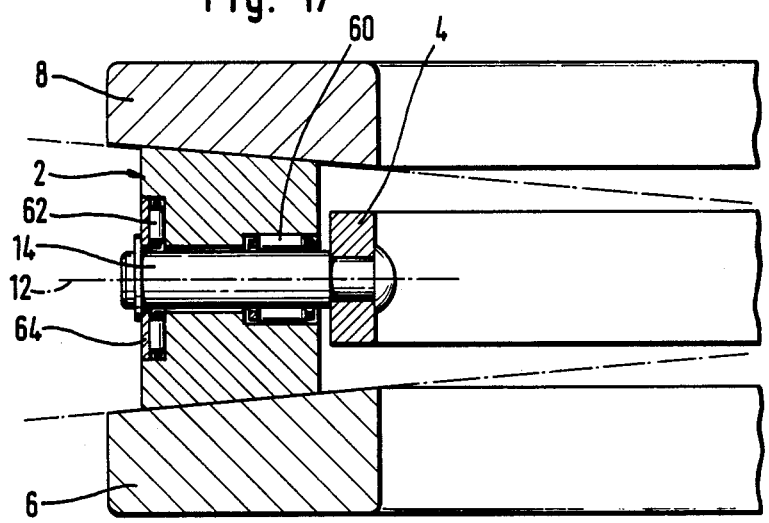

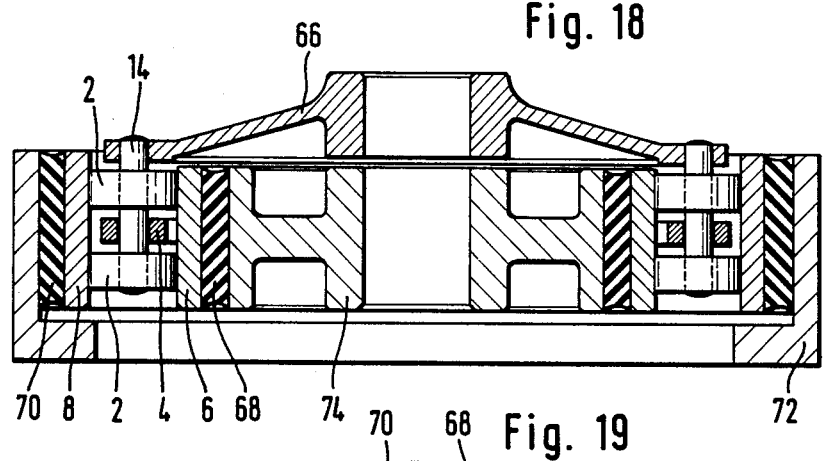
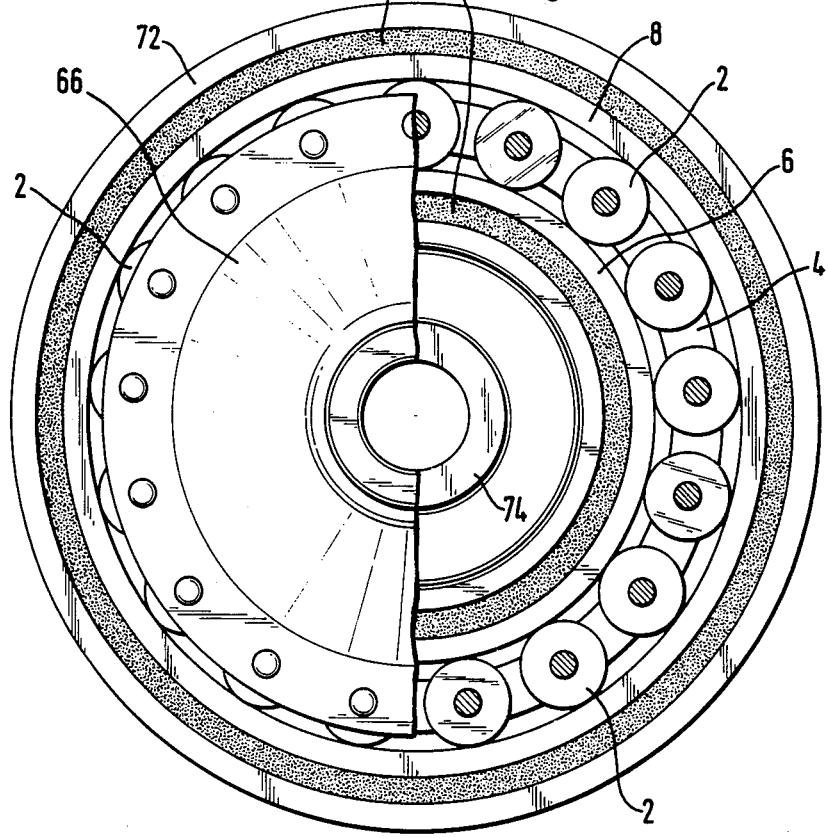

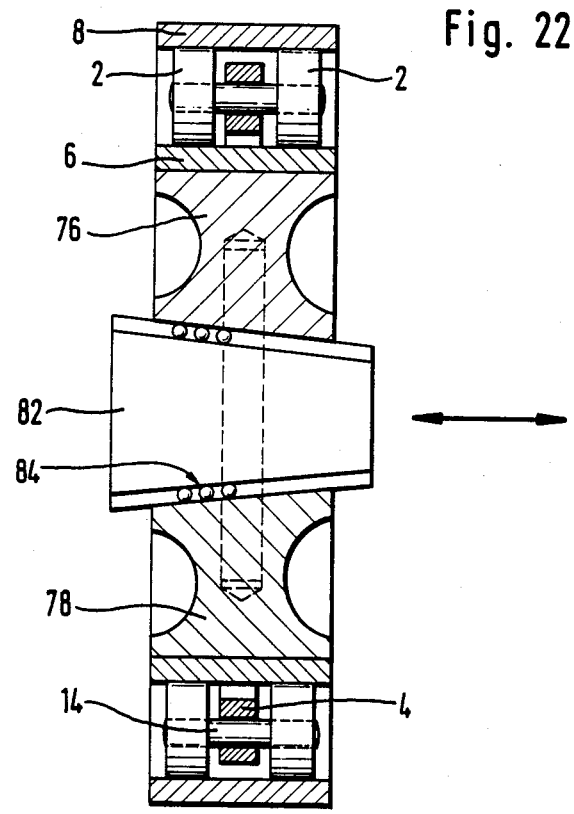
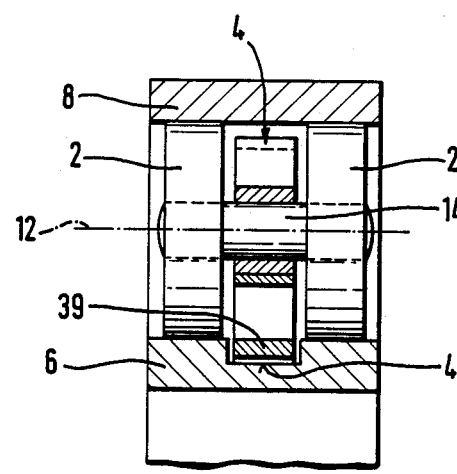

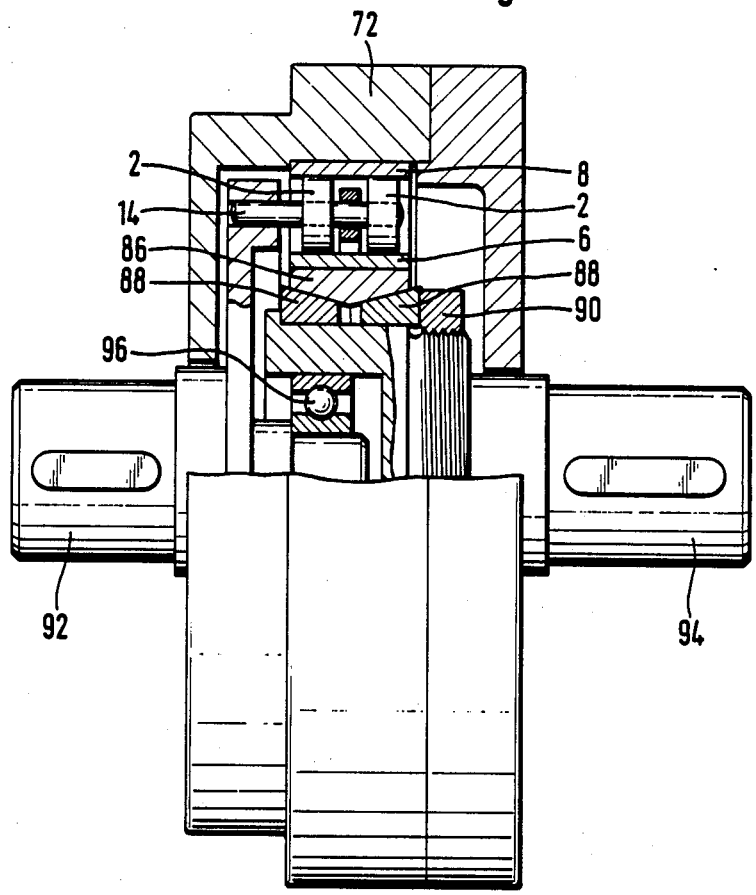

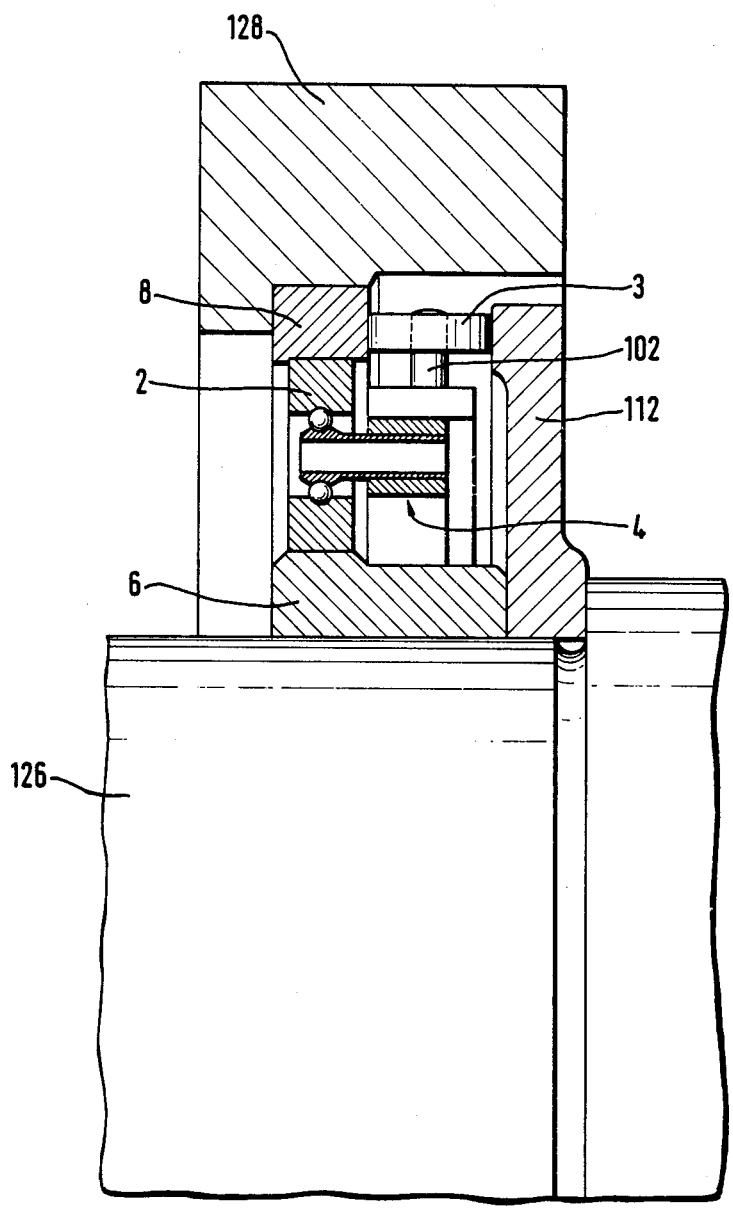

ARRANGEMENT WITH ROLLER ELEMENTS

BACKGROUND OF THE INVENTION

This invention relates to an arrangement, particularly a bearing arrangement, with roller elements which are guided by means of a guide ring and are arranged between two support rings.

New fields of use require bearings which may be ovalized up to 3% of their diameter during normal operation. For example, see U.S. Pat. No. 4,099,427, which discloses a sliding wedge transmission. Such a transmission contains a, for example, oval rotating body on which a deformable planetary wheel is mounted by means of roller elements. Further, U.S. Pat. No. 4,580,957 discloses a roll-ring compressor which contains a thin-walled ring piston arranged eccentrically with respect to the cylinder. The ring piston is mounted on a rotating body by means of roller elements and lies against the cylinder wall in a predetermined rolling region as a result of the eccentricity and a deformation. The bearing arrangement with the roller elements is correspondingly deformed. Today's conventional roller bearings are subjected by such deformations to high demands regarding kinematics and load capacity, whereby significant limitations with regard to efficiency and durability must be reckoned with. The reduction of the limiting speed of rotation and the increased friction values which reduce the efficiency of the known sliding wedge transmission are particularly disadvantageous. The aforementioned roll-ring compressor kinematically allows speeds of rotation up to about 12,000 rpm, which by a wide margin cannot be achieved by today's known bearing arrangements. In an ovalized or deformable bearing arrangement, the individual roller elements roll with differing speeds of rotation around the circumference, and with a roller element cage which is unyielding in the circumferential direction, consequently, a slippage arises between the roller elements, the cage and also the outer or inner support ring. The higher friction which results herefrom is very disadvantageous and leads to elevated temperatures and increased abrasion losses (wear). Further, if the roller elements in a bearing arrangement are guided by means of a cage, then as the bearing arrangement rotates, the roller elements slide along one side of the cage pocket, whereby an additional rolling resistance or frictional component is caused. The rubbing of the cage against its guide surfaces also increases the frictional moment. Further, the cage rods between the individual roller elements require a correspondingly large spacing between the roller elements.

SUMMARY OF THE INVENTION

The object of the invention is to further develop the type of arrangement described above to such an extent that a rubbing of the guide ring is avoided or at least substantially reduced. The frictional value of the arrangement is to be reduced at a low construction cost and with a small construction volume. The roller elements should be able to adjust to varying rolling speeds while avoiding any slippage, if the spacing of the roller elements from each other changes, particularly when deformations occur. Further upon deformation of at least one of the support rings, the arrangement should have a low frictional value and produce a high efficiency. The arrangement should have a simple construction with a low weight and structural volume and/or a long durability and a high degree of operational reliability.

To achieve this object it is proposed that the roller elements each be rotatably mounted on and/or with a shaft and that the guide ring be formed in such a way as to be yieldable and/or the shaft be connected with the guide ring in such a way that the guide elements can move relative to each other.

The arrangement of the invention is distinguished by a functionally reliable construction above all through avoidance of rubbing of the guide elements with respect to the roller elements. Because of the yieldable construction of the guide rings, the guide elements can move relative to each other, and slippage is substantially avoided. This is especially important in case of deformation of at least one of the support rings, whereby a higher efficiency can be assured. The roller elements may be the outer ring of small roller bearings, the inner ring of which is attached in each case on the shaft which is fastened outside of the bearing region in the yieldable, preferably elastically formed, guide ring. Consequently, sliding friction is avoided between the roller element and the guide ring. The rolling bodies of the aforementioned small roller bearing is subjected to hardly any radial load since the support forces which act between the two support rings act oppositely practically only on the roller element and apply hardly any load to the smaller inner bearing ring. The roller bodies of the smaller roller bearing are merely loaded by small return forces upon additional deformation of the guide ring as well as by small holding forces to maintain their distance. The guide ring is advantageously guided in an annular groove of one of the support rings so that direct lateral guiding of the roller elements transversely of the bearing axis is omitted and rubbing at the margin or edge does not occur. The guide ring turns at a lower speed than the guide elements so that frictional losses and abrasion are small.

A particularly advantageous embodiment is characterized in that the roller elements are formed in ring form and that the inner bearing ring of the inner roller bearing and or the shafts of each roller element is formed to be yieldable. An overloading of the inner roller bearing can hereby be avoided in a surprisingly simple manner. Basically, the deformation of the ring form roller element under load can be calculated very exactly and the play or the bearing gap of the inner roller bearing can be determined accordingly. If this bearing gap is exceeded due to an unforseen overload, then the roller elements of the inner roller bearing may be subjected to an impermissibly high load. An overload may be caused, on the one hand, by external influences, or on the other hand it may result from the fabrication. This refers in particular to dimensional deviations resulting from fabrication of the ring form roller elements and/or the roller bodies of the inner roller bearing. Further, especially when formed as axial bearings, design parallelism errors in the assembled condition can lead to such overloads. In conventional bearings, which have massive roller bodies instead of the ring form roller elements, high requirements for dimensional accuracy must be made, which lie in the micrometer range. The deformation of a massive full roller occurs progressively as a result of Herzian pressing, while the deformation of a ring form roller element occurs substantially linearly. In traversing the main load region of a roller bearing, the load change of the ring form roller element is significantly smaller than that of a massive full roll. In comparison to a full roll, in which the high load changes make themselves noticeable by disadvantageously producing noise, particularly at high rotational speeds, and further adversely influence the durability, the production of noise is substantially reduced by the ring form roller elements according to the invention, and the working life of the arrangement according to the invention or the bearing according to the invention is not insubstantially improved. Depending on the wall thickness, the ring form roller elements can be deformed or ovalized up to 1% of the outer diameter without any fear thereby of an impairment of the durability.

The permissible range of deformability of the roller elements according to the invention may be advantageously utilized in the invention without making all too large of demands on the production tolerances for the ring form roller elements as well as the bearing gap of the inner roller bearing. Also, a spreading of the shaft, which is normally disadvantageous with respect to the bearing gap, can be accommodated without any problem. A further important advantage of the radially resiliently formed roller element according to the invention is achieved by the more uniform load distribution upon application of a radial load and further by the avoidance of slippage in the zone which is not subjected to a load. It should be kept in mind that in conventional roller bearings which are guided with a cage, because of the bearing gap and a radial load the individual roller elements are strongly braked by cage friction and lubricant rubbing in the zone which is not subject to load. Upon entering the load zone, the roller elements must each be accelerated again. This produces frictional heat, and the roller elements make irregular or staggering movements in the cage pocket and roller track. These disadvantages are reliably avoided in a surprisingly simple manner by the roller bearings according to the invention, and this is achieved by eliminating cage friction through a small radial tension or prestress with the resilient guide ring. This prestress is greater than the frictional resistance of the inner roller bearing. The minimal movement in the circumferential direction when entering and leaving the load zone are offset in this invention by the guide ring which is yieldable in the circumferential direction.

In one significant embodiment of the invention the inner bearing ring of the inner roller bearing is formed as a thin-walled hollow shaft on which the roller bodies of the inner roller bearing are guided. Further, the axial length of the hollow shaft can be chosen such that it projects laterally out of the roller element and can be secured in the guide ring. In this embodiment the hollow shaft directly forms the shaft or pin for mounting and securing the roller elements in the guide ring. Further, if the guide ring consists of synthetic resin, for example, then the hollow shaft can also be arranged on a shaft integral with the guide ring.

In one specific embodiment the inner roller bearings are individually sealed off. For this purpose primarily two sealing plates are provided between which the roller bodies of the inner roller bearing are found. One of these sealing plates has a central opening through which the hollow shaft or the shaft is extended, while the axially opposite sealing plate is completely closed. The inner roller bearings are filled, between the sealing plates, with lubricant, which consist of synthetic resin or metal. The annular sealing plate can be positioned in accordance with the invention with a sealing lip in the vicinity of the central opening adjacent the hollow shaft; also a narrow, annular gap can be provided in the vicinity of the opening. The important thing for all embodiments is that the complete roller bearing arrangement is ventilated in optimum fashion and heat which is produced can be conducted away without any problem. This is in contrast to the previously commonplace sealed bearing arrangements in which in an appropriate case sealing elements are arranged between the outer and the inner support ring or bearing ring. In accordance with the invention such sealing means are omitted so that air can pass unhindered between the roller elements and at the same time the inner roller bearing is lubricated and sealed in the indicated manner.

The arrangement of the invention can basically be referred to as a roller bearing, the roller elements of which are each for their part mounted with respect to guide ring by means of so called inner roller bearings. It is especially advantageous to use the arrangement of the invention as a deformable radial bearing in machines corresponding to the initially mentioned U.S. patents or in comparable machines. The invention is not, however, limited thereto, but instead the use of the arrangement of the invention can also be of advantage in conventional areas of application, i.e., without deformation or ovalization, primarily in view of the high load capacity and the high limiting speed of rotation. This applies all the more when the roller elements are a component, namely the outer bearing ring, of standardized small roller bearings within the scope of the invention, which are commercially available at favorable prices. Further, the arrangement can be formed as an axial bearing in which the slippage and the cage friction have an even greater importance than in a radial bearing. Conventional axial bearings today have a coefficient of friction on the order of 0.004. With the arrangement of the invention a not insubstantial reduction of the coefficient of friction and an increase of the limiting speed of rotation can be achieved with a simple construction and a low cost of production. Furthermore, due to the favorable kinematic characteristics, the high load capacity, and the possibility of arranging the roller elements closely adjacent each other, the arrangement of the invention can be formed as a planetary transmission at low cost and with a simple construction.

BRIEF DESCRIPTION OF THE DRAWINGS

The invention will be explained hereinafter in further detail with reference to the accompanying drawings in which:

FIGS. 9 and 10 show an embodiment in which the guide ring is formed in chain form;

FIGS. 11 and 12 show an embodiment with arcuately formed roller surfaces on the two support rings;

FIGS. 13 through 15 show an embodiment formed as an axial bearing with two roller elements per each shaft;

FIGS. 16 and 17 show an embodiment of the arrangement as an axial bearing with conical roller elements;

FIGS. 18 and 19 show an embodiment as a frictional drive;

FIG. 22 shows a further embodiment as a frictional drive with a conical drive wedge for adjusting the moment of rotation during operation;

FIGS. 23 and 24 show embodiments as frictional drives with annular tension springs;

FIG. 25 shows an arrangement with a guide ring which is guided in an annular groove;

FIG. 39 shows a further embodiment of a combined bearing.

DETAILED DESCRIPTION OF PREFERRED EMBODIMENTS

Figure 1:
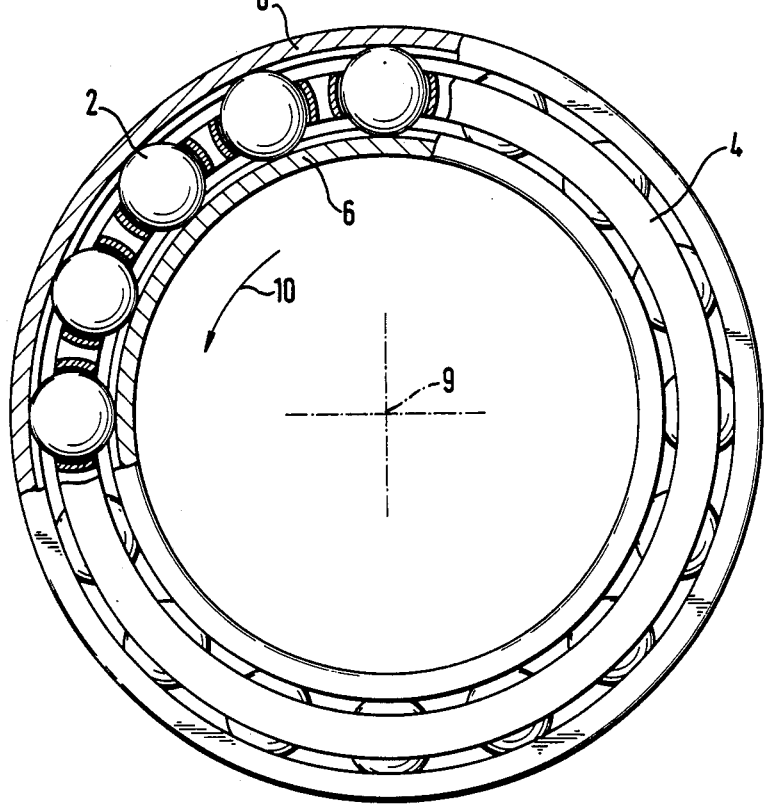
FIGS. 1 through 4 show schematic representations of a known arrangement, i.e. a ball bearing, in order to explain the working relationships and the prior disadvantages resulting therefrom.
Figure 2:
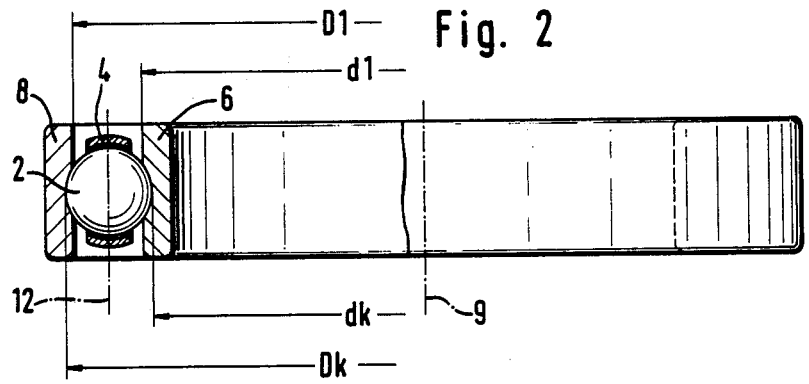

FIGS. 1 and 2 show a know ball bearing in plan view and in section, the roller elements 2 of which are guided between two bearing rings or support rings 6 and 8 with a guide ring 4 formed as a cage. Upon rotation of the inner support ring 6 around the bearing axis 9 in the direction of arrow 10, the roller elements 2 slide along the side of the practically rigid guide ring 4 which is likewise driven in the direction of rotation. Despite this additional frictional component, the total rolling resistance is lower in comparison to a bearing without a cage. Rolling without sliding takes place only at the diameter Dk-dk, i.e., in the middle of the roller element 2. The sliding component or slippage component increases in the outward direction to diameter D1 from the outer support ring 8, and in the inward direction to diameter d1 from the inner support ring 6, in accordance with the spacing with respect to the axis of rotation 12 of the roller element 2. In a bearing arrangement of this type, the coefficient of friction lies between 0.0015 and 0.003, substantially above the coefficient of friction=0.0005 of a purely radially loaded cylinder roller bearing. Further the coefficient of friction is increased with increases in the load and rotational speed.

Figure 3:
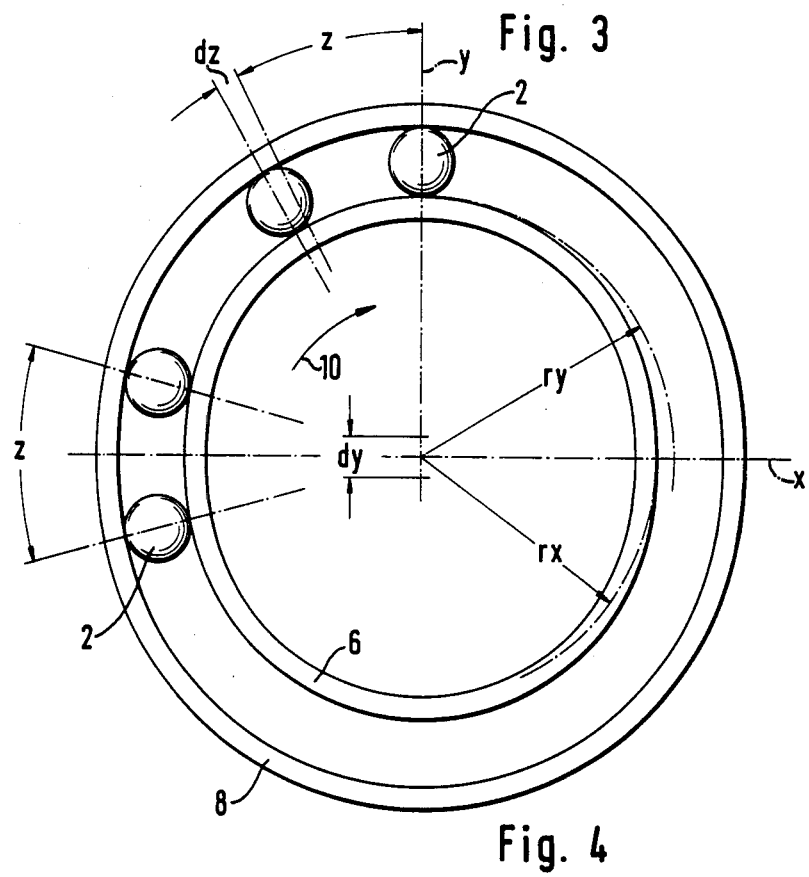

FIG. 3 schematically shows the deformed bearing arrangement of FIG. 1, whereby the deformation in the direction of the y-axis is shown greatly enlarged. The radius ry is larger than the radius rx in the x-direction. Upon rotation of the inner support ring 6 or the outer support ring 8 in the direction of arrow 10, the rotational speed of the roller body 2 also increases due to the corresponding increase in diameter. If rolling occurs without slipping, the spacing z consequently also changes by the amount dz. Since a guide ring receives a forced rotational speed from the roller element 2 which rotates the fastest, only the roller elements which are momentarily located at the y-axis roll without slipping.

Figure 4:
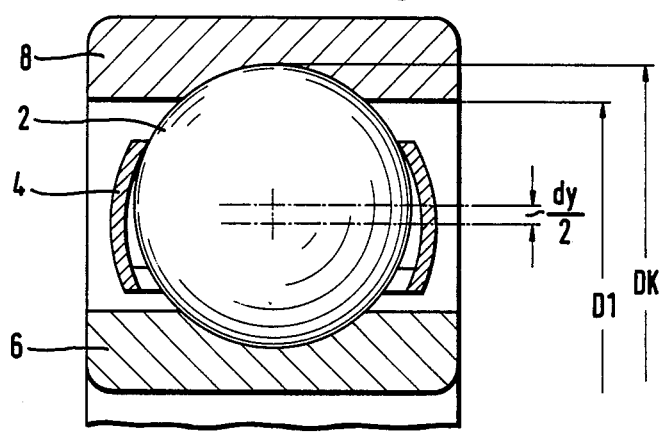

FIG. 4 shows an enlarged longitudinal section in the vicinity of the roller element 2 shown on the y-axis at the top of FIG. 3. Due to the enlargement of the diameter by half the amount of dy, a clamping effect occurs between the roller element 2 and the guide ring 4. On the one hand, the degree of freedom in the circumferential direction is adversely affected thereby, and furthermore additional frictional losses are caused. A similar but directly opposite thing also applies to the roller elements located in the vicinity of the x-axis. It can be seen from the illustrated functional relationships that upon deformation of the previously known bearing arrangement, the limiting speed of rotation is significantly lower than the values usually given in catalogs for such bearing arrangements. Corresponding statements also apply to arrangements with cylindrical rollers in which the cage friction and boundary rubbing the coefficient of friction of each individual cylindrical roller is significantly increased upon deformation.

Figure 5:
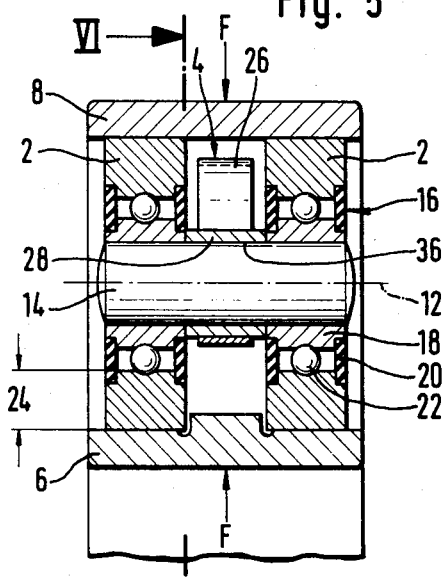
FIG. 5 is an illustration of the principle of the arrangement of the invention in which the roller elements are connected through shafts by means of an elastic guide ring.
Figure 6:
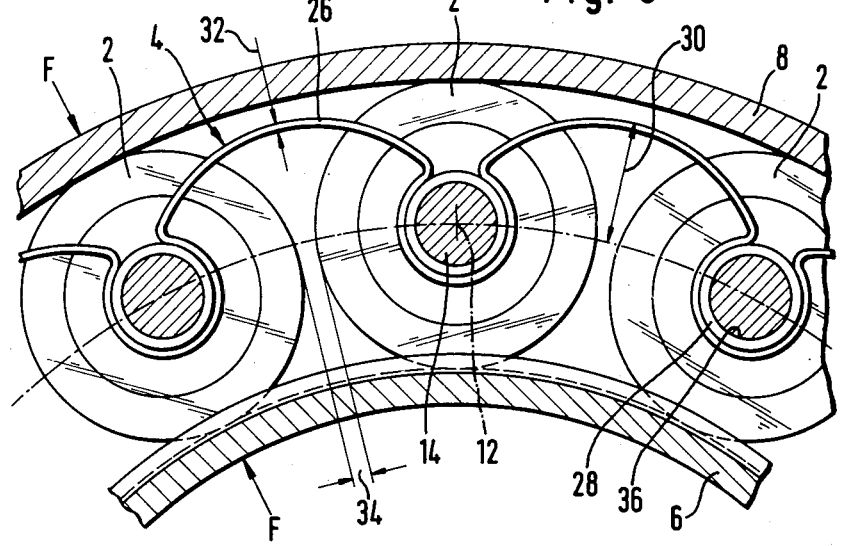
FIG. 6 is a sectional view taken along line VI—VI or FIG. 5.

In FIGS. 5 and 6 an arrangement according to the invention which is formed as a roller bearing is shown in an axial section and in elevation. Between the two support rings 6 and 8, two roller elements 2 are rotatably arranged in each case on a shaft 14. The roller elements 2 are each a component of an inner roller bearing 16 and constitute its outer bearing ring. The inner bearing rings 18 are fixedly connected with the shaft 14, particularly by being press fit thereon. Between the roller bearings 16 which are arranged in this way in pairs on the shaft 14 is found the guide ring 4, in the bores 36 of which the shafts 14 are pressed in accordance with the invention under predetermined tension. In accordance with the invention there is no frictional contact between the guide ring 4 and the roller elements 2. The connection is effected in the invention through the roller bearings 16 and the shafts 14. The roller bearings 16 are provided with the thick-walled outer rings, i.e. roller elements 2, and with the comparatively thin-walled inner rings and are sealed laterally within the scope of the invention with sealing rings 20. By means of the roller bodies formed as small balls 22, the roller elements 2 are axially and radially mounted with respect to the axis of rotation 12. The inner space sealed off by the sealing rings 20 is filled with grease for permanent lubrication. Within the scope of the invention, standardized roller bearings 16 with lateral sealing may be used, whereby the manufacturing costs of the arrangement of the invention can be kept low. A force F acting on the support rings 6 and 8 is directly transmitted by the roller bodies 2 without applying a load to the roller bodies 2. The wall thickness 24 of the roller elements 2 is predetermined in accordance with the invention in such a way that upon loading a deformation is smaller than the predetermined bearing play of the roller bodies 22. The inner roller bodies 22 are consequently only subjected to small forces by the resiliently flexible guide ring 4. All that there is to be taken up are the small return forces which arise upon additional deformation of the guide ring as well as the small holding forces for maintaining the distance between the individual shafts 14 or roller elements 2.

As can be seen from FIG. 6, guide ring 4 comprises outwardly bent portions or curved bows 26 and ring form holders or mountings 28 in the apertures 36 of which the shafts 14 are fastened by the compressive force of the holders. The guide ring 4 is formed of an elastically flexible and/or resilient material, for example spring steel, which makes possible movement of the individual shafts 14 together with the roller elements 2 arranged thereon both in the circumferential direction as well as in the radial direction. The initially described displacements dz and dy of the roller elements 2 which arise upon deformation of the support ring 6 or 8, can occur without significant return forces, whereby the spacing 30 of the bow 26 can change accordingly. The wall thickness 32 of the bow 26 is chosen to be correspondingly thin. In the circumferential direction the roller elements 2 have a spacing 34 with respect to each other which may in accordance with the invention be kept very small since the flexible guide ring is arranged laterally outside of the bearing region or roller region of the roller elements 2. This is in contrast to the usual bearing arrangements, the cages of which also comprise rods in the circumferential direction between the roller elements. Thus, in the same diameter significantly more roller elements can be arranged in the bearing arrangement of the invention, whereby the peak load can be substantially increased. Further the cage friction described above with reference to FIGS. 1 and 2 is avoided and consequently also the slippage. Further, upon ovalization a slip-free rotational speed change is made possible. Thus, in the bearing arrangement according to the invention the coefficient of friction lies at 0.0005 to 0.001, i.e similar the value of an individual roller and significantly lower than in a conventional roller bearing with a cage. Further, since in accordance with the invention the two large bearing rings or support rings 6 and 8 are not sealed, but rather only the relatively small inner roller bearings 16, e.g. by means of the aforementioned sealing rings 20, significantly smaller seal speeds also arise, whereby a significantly better removal of heat from the overall bearing arrangement is achieved since the support rings 6 and 8 and the roller elements 2 are open. The limiting speed of rotation is determined in accordance with the invention by the limiting speed of rotation of the smaller inner roller bearing. The limiting speed of rotation which may thus be achieved may attain double the value of a comparable roller bearing with a standard construction. Slippage as well as friction against the guide ring are avoided in accordance with the invention at deformations up to on the order of 5%.

Figure 7:
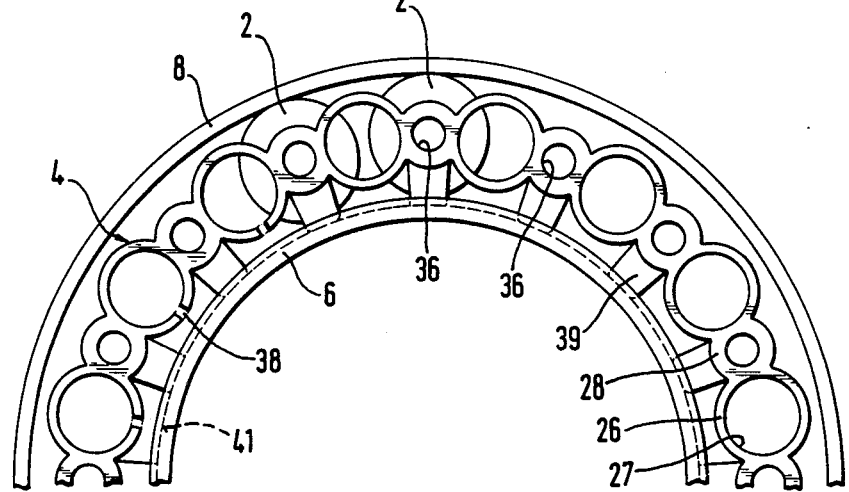
FIGS. 7 and 8 show an arrangement formed as a single row bearing with a guide ring having yieldably deformable perforations or bows.
Figure 8:
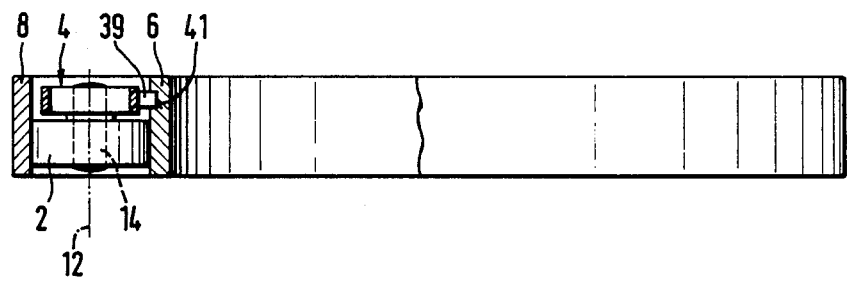

FIGS. 7 and 8 show a single row bearing arrangement having one roller element 2 per each shaft 14, whereby in FIG. 7 for reasons of simplicity in illustration only two of the roller elements 2 are shown. The shafts 14 are again secured in openings 36 enclosed by ring form holders or mountings 28 of a guide ring 4. The holders 28 are each connected to each other by ring form bows 26 with perforations 27. The guide ring is made of a flexible synthetic resin, or it may also be made of metal. The resilience is achieved by deformation or ovalization of the ring form bow 26. In particular, in the metal embodiment of guide ring 4, the spring effect can be reduced by a slit 38, so that consequently the connection of the holders 28 is effected through the opposite semicircle of the bow 26. As can be seen from FIG. 8, the roller element 2 is provided with a spacing with respect to the guide ring 4 in the direction of the axis of rotation 12 in order to avoid frictional contact. In this embodiment the guide ring also is located outside of the roller track of the roller elements 2. The roller elements 2 are likewise rotatable with respect to the shafts 14 by means of small inner roller bearings, which are not shown here in further detail.

The guide ring 4 contains radially inwardly directed parts 39 which engage in an annular groove 41 of the inner support ring 6. The guide ring 4 and consequently also the roller elements 2 are guided axially, i.e. parallel to the bearing axis 9, in the annular groove 41. The edge friction, which usually arises when the roller elements are guided on appendages of the support ring, does not occur in this important embodiment. Since the guide ring 4 is moved at a slower speed than the roller elements with respect to the support ring 6, the losses occasioned by friction are also correspondingly small. A further important aspect of this invention is the arrangement of the parts 39 in the area of the mountings or holders 28 for the shafts or roller elements 2. The movability of the roller elements 2 with respect to each other is practically not influenced at all by the guiding of the guide ring by means of the parts 39 in the support ring 6. It is understood that within the scope of the invention a comparable annular groove can additionally or alternatively also be provided in the outer support ring 8. In this particular embodiment the roller elements 2 run on the cylindrical roller surfaces of the support rings 6, 8 without their side surfaces sliding against bands, appendages, etc. of the support rings.

In the above described embodiments the roller elements 2 are rotatable with respect to the shafts 14 which are fastened in the guide ring 4 so that they cannot rotate. Alternatively within the scope of the invention, the shafts can be arranged to be rotatable in the guide ring and the roller elements can each be connected to the shafts so that they cannot rotate. The shafts and roller elements can then also optionally be formed integrally. Further, a slide bearing of the roller elements or of the shafts can be provided in the guide ring, whereby a stopping moment or starting moment can be predetermined; this can be particularly advantageous in lifting tools, elevators, or the like. Shafts and roller elements can further be integral within the scope of the invention, whereby the shafts are then mounted in the bores of the guide ring by means of slide bearings.

FIGS. 9 and 10 show an embodiment of the arrangement of the invention with a guide ring 4 formed in chain form. The shafts 14 are each fastened in a link 40 which has an elongated slot 42 at least one end. The individual links 40 are each connected to one another by means of rivets 44, whereby the elongated slot makes possible a displacement in the circumferential direction. If the elongated slot 42 additionally has a greater width in the radial direction than the rivet diameter, then movability in the radial direction is made possible. Optionally, the elongated slot 42 can also be replaced by a bore with a correspondingly large diameter in order to make relative movements possible in the circumferential as well as in the radial direction in accordance with the invention. The shaft 14 lies with a band or shoulder 46 against the guide ring 4 in order to prescribe the spacing with respect to the guide ring, while the attachment outside is effected by upsetting or riveting the head 48.

The embodiment according to FIG. 11 makes possible the accommodation of small axial forces in the direction of the axis of rotation 12 of the roller element 2 which is parallel to the bearing axis. The outer surface 50 and likewise the running tracks of the support rings 6, 8 are spherically formed and provided with a radius. In order to reduce the slippage described initially with reference to FIG. 1, the radius 52 is enlarged compared to the radius of a complete sphere. In this significant embodiment the radius 52 is equal in size to the diameter of the roller element 2. As can be seen in conjunction with FIG. 12, for assembly the roller element 2 is inserted from the side in the direction of arrow 54 between the support rings 6, 8 and brought into the position shown in FIG. 11 by pivoting.

In FIGS. 13 through 15 an embodiment of the arrangement of the invention as an axial bearing is schematically illustrated. The support rings 6, 8 can be loaded by an axial force parallel the bearing axis 9. The guide ring 4, which in this embodiment is stiff, is provided with a number of roller elements 2 arranged next to each other in pairs in the circumferential direction. Rollers 2 are again arranged to be rotatable on shafts 14 without coming directly in contact with the guide ring 4. In contrast to conventional axial bearings with cages which do not make possible any close distribution of the roller elements, the roller elements 2 of circumferentially adjacent shafts 14 are arranged comparatively close to each other, whereby a favorable load capacity can be realized, although because of the guide ring, the entire available width of the support rings 6, 8 cannot be used as bearing surface. By means of the pairwise arrangement of the guide rollers 2 in each case, the slippage is significantly reduced in comparison to a conventional axial bearing with a relatively wide roller element in each case. A diameter-width relationship on the order of 2 or move has proved to be especially advantageous. The roller element 2 lying closest to the bearing axis 9 can rotate with a lower speed of rotation than the other roller element arranged on the same shaft 14 at a greater distance from the bearing axis, whereby the slippage and the frictional losses can be kept small. Further, a centrifugal force loading of the guide ring also can not lead to additional frictional moment as is the case in a conventional axial roller bearing. The shafts 14 have an annular shoulder 55 against which the inner bearing rings 18 abut in order to assure the spacing of the roller elements 2 from the guide ring 4 in accordance with the invention. Centrifugal forces of the roller elements are taken up through the attachment of the shafts in the guide ring, particularly by frictional mounts. As a result of the lack of friction between the guide ring 4 and the roller elements 2 as well as the low slippage, high limiting speeds of rotation are possible, and indeed, at a significantly lower coefficient of friction on the order of from 0.0012 to 0.0015.

FIG. 16 shows an axial bearing which has an ideal rolling resistance. Roller elements 2 provided with a conical outer surface are attached on the guide ring 4 through the shaft 14 and the inner bearing 16. The inner bearing ring 18 is secured on the shaft 14 by a securing ring 56. The bearing surfaces are likewise conically formed. The points of the cones intersect the bearing axis 9, and in accordance with the invention the roller elements 2 consequently run without slipping on the bearing surfaces of the support rings 6, 8; the roll ratio Da:da is constant. In accordance with the invention the diameter of the roller elements 2 is chosen in relation to the diameter of the support rings 6, 8 in such a way that the opening angle 58 of the cone is relatively small, and particularly is between 2 degrees and 4 degrees in size. Because of the small opening angle 58, the radial force Fx to be taken up by the guide ring 4 upon application of an axial force Fy remains relatively small. In the embodiment according to FIG. 14, the radial forces together with the centrifugal force of the roller element 2 are taken up through the roller bodies of the roller bearing 16 and transmitted through the attached shaft 14 to the guide ring.

For larger bearing sizes the embodiment of the axial bearing illustrated in FIG. 17 is advantageous. The roller elements 2 are mounted on the shaft 14 radially with respect to its axis of rotation 12 by means of a needle bearing 60. Axial mounting with respect to the axis of rotation 12, and thus transmission of the forces Fx which are radial with respect to the bearing axis 9, is accomplished by a further needle bearing 62 which is attached through a support plate 64, or by securing ring 56, on the shaft 14.

FIGS. 18 and 19 show in axial section and in plan view a significant embodiment of the invention as a planetary drive with a transmission ratio i=1:2.26. The frictional drive contains seventeen roller elements 2 distributed in each case in pairs around the circumference. The guide ring 4 is arranged in accordance with the invention in each case in the middle between two roller elements 2 arranged on the shafts 14 so as to be free of contact with the roller elements. The shafts 14 are extended outwardly on one side and fastened in bores of a coupling piece 66. The roller elements 2 are prestressed between the two thin-walled support rings 6, 8 which may be formed in particular of a hardened spring steel. In accordance with the invention the free intermediate space between the two support rings 6, 8 is smaller than the outer diameter of the roller elements 2. The support rings 6, 8 are thin-walled and elastically deformable in accordance with the invention.

Figure 20:
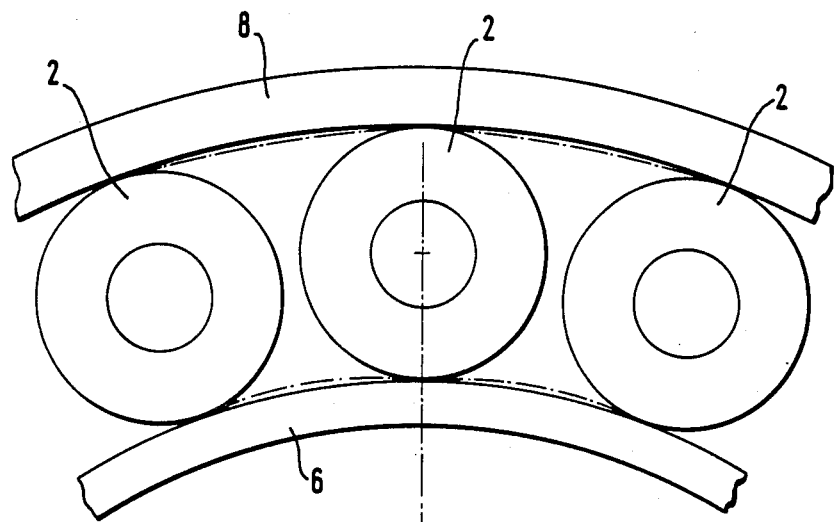
FIG. 20 shows a schematic illustration of the roller elements of the frictional drive according to FIGS. 18 and 19.

As can be seen in conjunction with FIG. 20, due to the aforementioned prestressing, the roller surfaces of the thin-walled support ring 6 wrap slightly around or partially embrace the roller elements 2. As indicated by the broken lines, due to the prestressing, the outer support ring 8 is stretched, while the inner support ring is bent outwardly or bowed out. Due to the partial enclosure of the roller elements, the Herzian pressure is reduced. The prestressing produces radial forces distributed uniformly on the individual roller elements. The maximum transmissible rotational moment is determined by the degree of prestressing which is adjustable within the scope of this invention. In order to generate the prestressing, the support ring 6 is arranged on a ring 68 or a layer of resiliently elastic material, an elastomer, particularly rubber, or a corresponding synthetic resin. Similarly, the outer support ring 8 is arranged in a housing 72 over a ring or a layer 70. In accordance with the invention the layer thickness is chosen in such a way that a damping of the rotational moment or an oscillation damping also takes place simultaneously, and in an appropriate case a displacement between the coupling portion 66 and the drive shaft 74 can also be compensated for or equalized. In this significant embodiment of the invention an elastic drive coupling can be omitted.

The transmission of the invention can transmit a maximum rotational moment of 400 Nm at an efficiency of 98% with a rolling diameter of 120 mm. In comparison hereto, it should be noted that a planetary drive with teeth can hardly achieve a transmission ratio of less than 1:2.5 due to the geometry of the teeth and the minimum diameter of the planetary gears; usually in a planetary transmission three planetary gears are distributed around the circumference, whereby the transmissible rotational moment is limited. With a frictional drive transmission ratios i from approximately 1:2.1 to approximately 1:3.5 can be achieved. In accordance with the invention the roller elements can have relatively small diameters and smaller transmission ratios can be reliably achieved. In accordance with the invention the prestressing and thus the transmissible power is adjustable.

Figure 21:
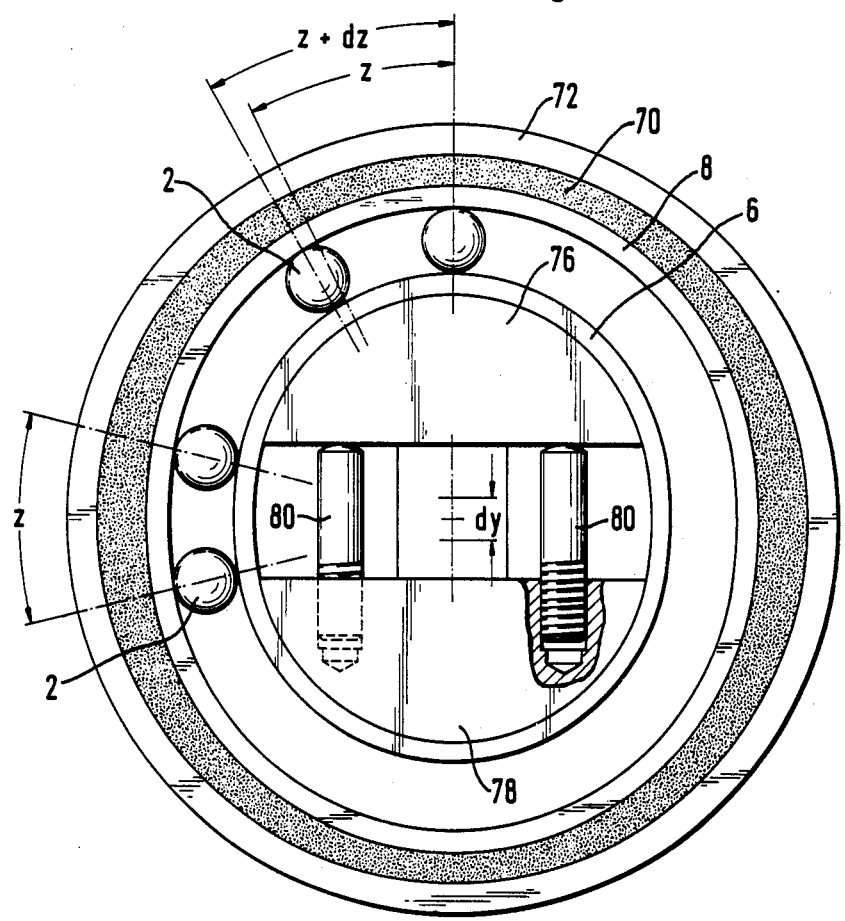
FIG. 21 shows a frictional drive with adjustable prestressing of the support rings.

FIG. 21 shows schematically an embodiment of the transmission with an exaggerated illustration of a deformation dy of a thin-walled inner support ring 6 by means of two drive cams or holding bodies 76, 78. The holding bodies 76, 78 are formed segmentally, whereby their spacing with respect to each other, and consequently also the deformation dy, is determined by means of shafts 80. The relatively thick-walled outer support ring 8 is again supported over a layer 70 or a rubber ring or the like in the housing 72, or is vulcanized therein. By appropriate choice of the wall thickness, and particularly that of the support ring 8, with respect to the diameter the radial force loading can be precisely calculated in advance proportional to the deformation in accordance with the invention. The desired rotational moment is precisely adjustable by pressing apart the two drive cams or holding bodies 76, 78 by means of threaded shafts 80. The layer thickness of the layer 70 between the housing 72 and the outer support ring 8 lies within the scope of the invention in the order of magnitude of the 10-fold value of half of the maximum deformation dy. This embodiment is distinguished by the adjustability of the rotational moment and the independent regulation in case of wear. In accordance with the invention the roller elements 2 are guided in the above explained manner by means of a guide ring (not shown).

FIG. 22 shows an embodiment of the transmission in which the holding bodies 76, 78 are adjustable with respect to each other by means of a conical draw wedge 82. In this significant embodiment the rotational moment can be adjusted during operation in accordance with the adjustment of the draw wedge 82. Between the draw wedge 82 and the holding bodies or drive cams 76, 78 needle bearing cages 84 are arranged to reduce the friction. This embodiment is advantageously used if when starting large masses must be accelerated. By displacing the draw wedge 82 in such a way that the deformation dy approaches zero, the radial loading of the roller elements 2 also approaches zero. A forwardly connected drive unit consequently starts running in neutral, and by displacing the draw wedge the mass to be accelerated, for example a pump, is accelerated with corresponding transmission of the rotational moment to the specified value.

FIG. 23 shows an embodiment of the transmission with an outer support ring 8 arranged fixed in the housing 72. The inner support ring 6 is arranged on an expanding annular spring 86 which is arranged in a known manner on two conical rings 88. In this embodiment of the invention the inner support ring 6 can be expanded by tightening the tensioning nut 90 in order to produce the above-mentioned strain over the roller elements 2 in the desired manner. The transmissible rotational moment between the shafts 92, 94 is determined in accordance with the prestressing, i.e. in accordance with the adjustment of the tensioning nut 90. Upon occurrence of wear, a readjustment of the rotational moment can take place in a simple manner by tightening the tensioning nut 90. The two shafts 92 and 94 are supported and oriented with respect to each other by means of a bearing 96, whereby the rotational moment is transmissible to the shaft 92 through the elongated shafts 14.

Figure 24:
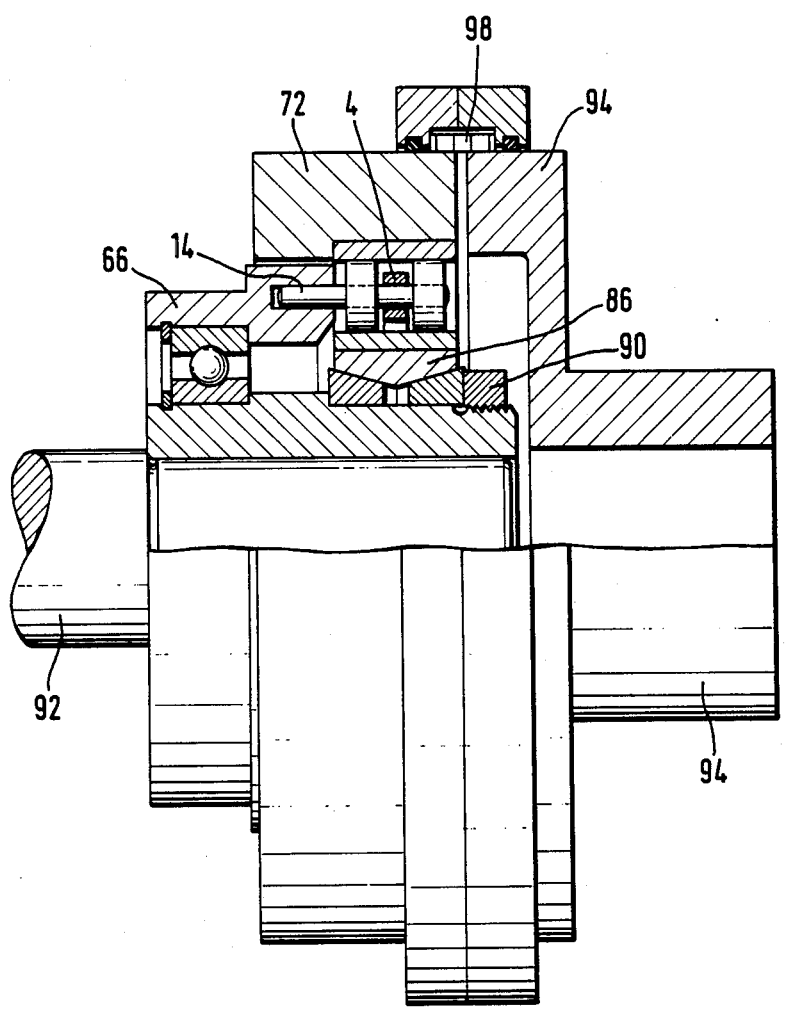

Finally, FIG. 24 shows an embodiment in which the guide ring 4 or the shafts 14 are connected with the coupling portion 66. In this embodiment the coupling portion 66 is held fast, rather than the housing, in order to transmit a rotational moment from the one shaft 92 to the other shaft 94. The adjustment of the rotational moment takes place again in accordance with the previous example through the tensioning nut 90 and the ring tensioning spring 86. The housing 72 is connected with the shaft 94, shown here at the right of the drawing, through a resilient coupling 98, which advantageously is formed as a sliding wedge coupling or toothed band coupling according to the sliding wedge principle, so that a displacement or offset of the shafts 92, 94 can be taken up without any problem.

FIG. 25 schematically shows similar to FIG. 5 a significant embodiment with an annular groove 41 in the inner support ring 6. The guide ring 4 engages with its part 39 in this annular groove and takes over the axial guidance of the roller elements 2. The roller elements 2 and the shaft 14 are each attached and secured against displacement in the direction of the axis of rotation 12 with respect to each other as well as with respect to the guide ring 4. In particular, this axial attachment is effected by a press fit; however, within the scope of the invention other comparable measures, such as securing rings, appendages, bands, or the like, can be provided for axially fixing the roller elements 2, the guide ring 4 as well as the shafts 14 with respect to each other.

Figure 26:
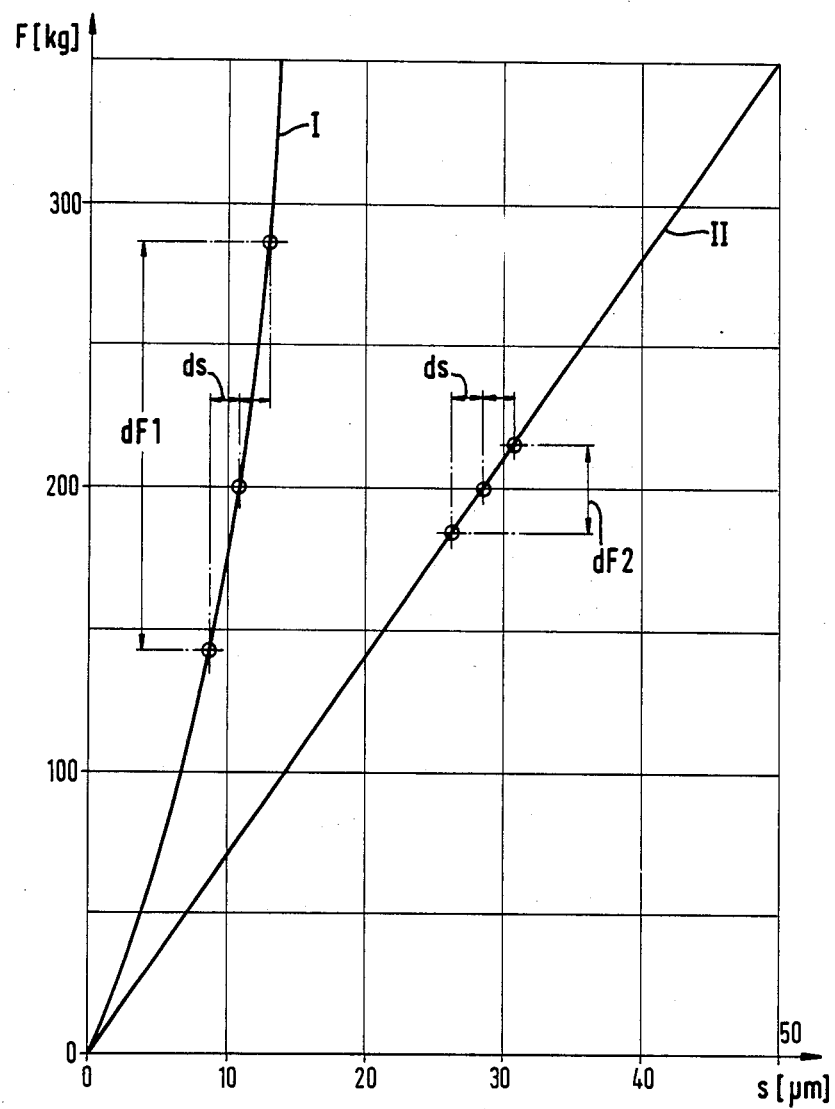
FIG. 26 is a load-path diagram of a conventional massive roller element and of a ring form roller element according to the invention.
Figure 27:
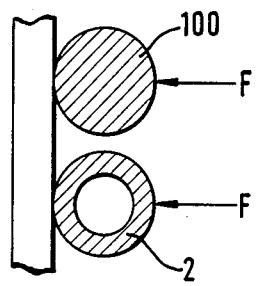
FIG. 27 shows schematically a massive roller element and a ring form roller element.

In FIG. 26 the deformation arising under a load F is shown for a massive guide element corresponding to the curve I and that for an annular guide element is shown corresponding to the curve II. The deformation of the massive roller element 100, shown schematically in FIG. 27, changes progressively due to the Herzian pressure, while the deformation of the inner roller element 2 changes substantially linearly. With an applied load of F=200 kg, a deformation of approximately 11 micrometers results for the roller element 100, while a deformation of approximately 29 micrometers arises for the annular roller element 2. If one assumes the same production tolerance ds of plus/minus 2 micrometers for both roller elements 100 and 2, then there results a load change dF1 of approximately plus/minus 80 kg results for the massive roller element 100 when traversing the zone of maximum load. In contrast, a significantly lower load change dF2 of plus/minus 12 kg results for the annular roller element 2 according to the invention. Consequently, the proposed annular construction of the roller elements 2 significantly reduces load variations which in the past have lead to disadvantageous noises, particularly at high rotational speeds, and further substantially reduced the working life or durability.

Figure 28:
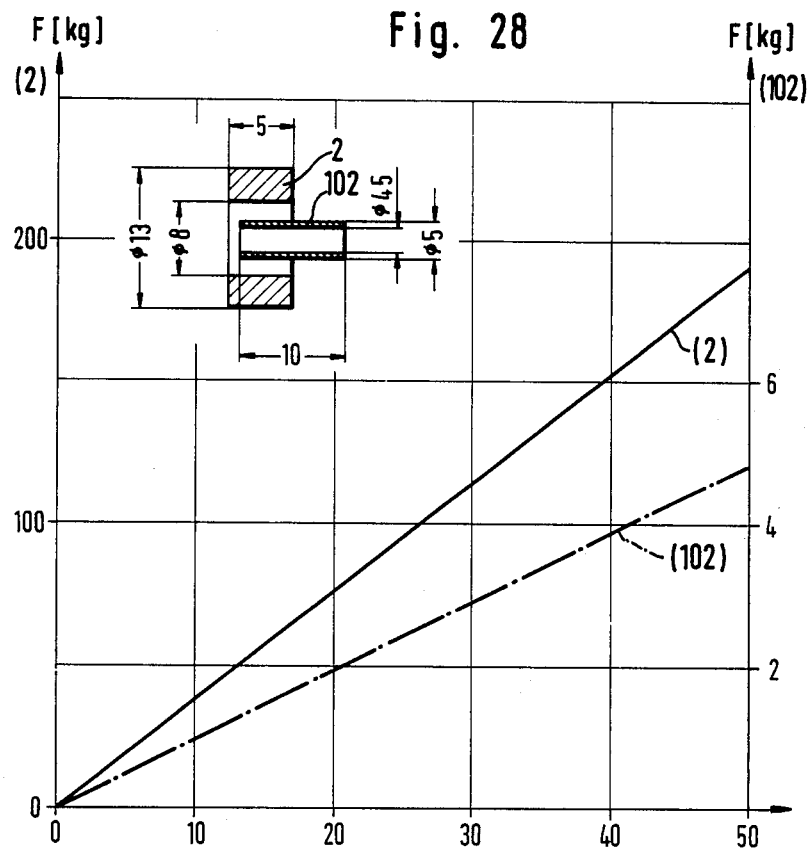
FIG. 28 shows a load-path diagram of an annular roller element with a hollow support shaft.

FIG. 28 shows as an example a load-path diagram of a roller element 2, which is mounted in accordance with the invention by means of guide bodies, not shown here in further detail, on a thin-walled hollow shaft 102. The roller element 2, which is formed in accordance with the invention as a substantially cylindrical roller with a central bore, has an axial length of 5 mm, an outer diameter of 13 mm and an inner diameter of 8 mm. The hollow shaft 102 has, in contrast, an outer diameter of 5 mm and an inner diameter of 4.5 mm with axial length of 10 mm. Thus, for example, if the wall thickness of the hollow shaft 102 amounts to approximately 5% of the outer diameter, then with a deformation of, for example, 20 micrometers per meter, which exceeds the bearing gap, only approximately 1% of the additionally generated support force delta F, which can amount, for example, to approximately 200 kg, acts on the inner roller element. The bearing arrangement according to the invention is therefore also usable when high load shocks arise or plan parallelism errors are produced by the assembly. Further, larger production tolerances can also be permitted, whereby economical manufacture is assured.

Figure 29:
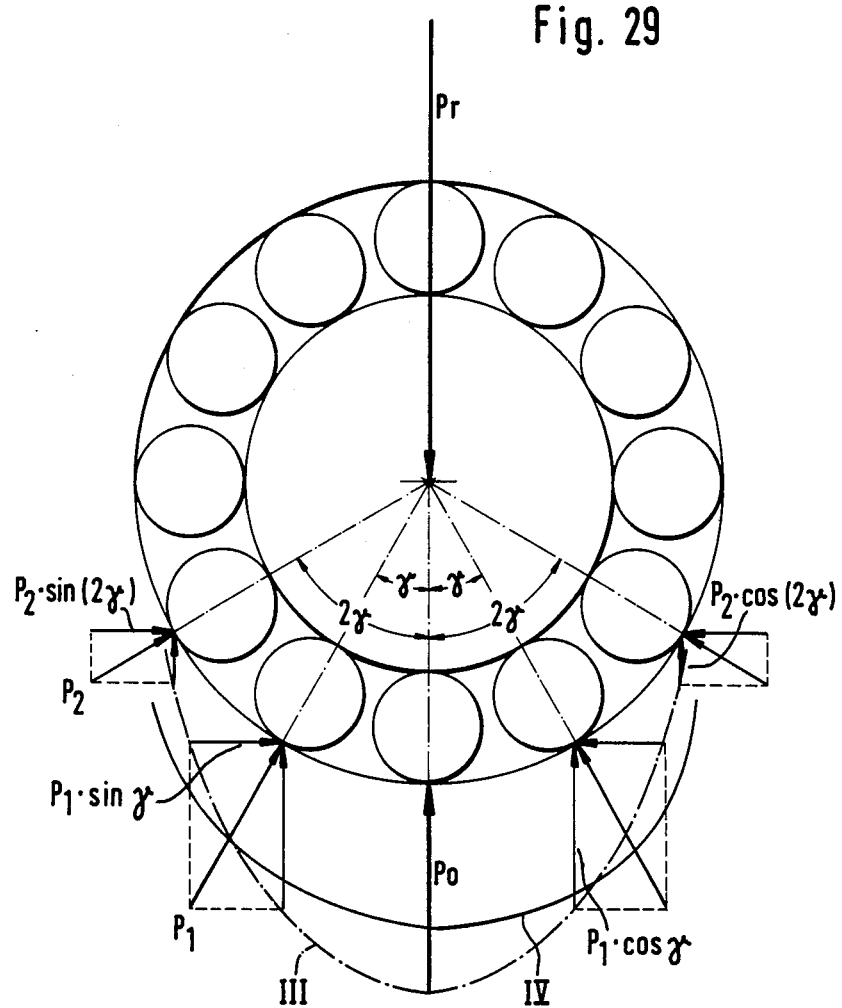
FIG. 29 shows the load distribution in a roller bearing upon radial loading.
Figure 30:
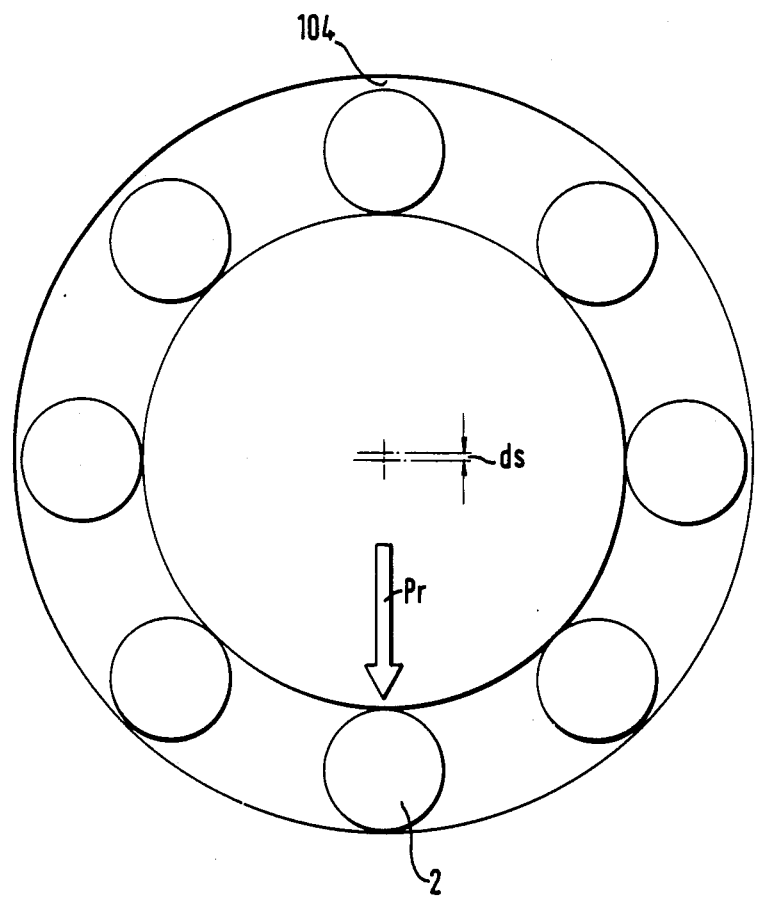
FIG. 30 shows a schematic view for explaining the bearing gap upon loading.

In FIG. 29 the load distribution of a radial bearing loaded by a radial force Pr is schematically illustrated. The curve III applies to massive roller elements, and the curve IV applies to annular guiding elements. Because of the radial deformability of the annular roller elements, a significantly more uniform load distribution results in accordance with curve IV. The force Po diametrically opposed to the radial force Pr applied in the force vector lines, is significantly larger in accordance with curve III than in accordance with curve IV. The load capacity of the roller bearing according to the invention is accordingly significantly larger than in conventional bearings.

FIG. 23 shows schematically the change of the bearing gap upon loading and a deformation ds as a result of a radial force Pr. The roller element 2 located at the bottom of the drawing and compressed between the support ring which is shown in this figure only schematically as a circle. The roller element located at the top of the drawing in the non-loaded zone of a conventional roller bearing guided with a cage, has an air gap 104 toward the outer bearing ring. As a result of the bearing gap and the radial load the roller elements of the unloaded zone are initially strongly braked by cage and lubricant friction and accelerated again upon entry into the load zone. The results are frictional heat and staggered movements of the roller elements in the cage pocket and roller track. These disadvantages are avoided in the roller bearing according to the invention since cage friction does not occur and in addition in accordance with the invention a prestress is applied to the roller elements by the resiliently elastic support ring. This prestress is larger than the frictional resistance of the inner roller bearing. The roller elements are consequently also at comparatively low rotational speeds reliably brought into contact and guided on one of the support rings, and particularly against the outer support ring. Through the circumferentially resilient construction of the guide ring, minimal movements in the circumferential direction upon entry into or departure from the load zone can be compensated for.

Figure 31:
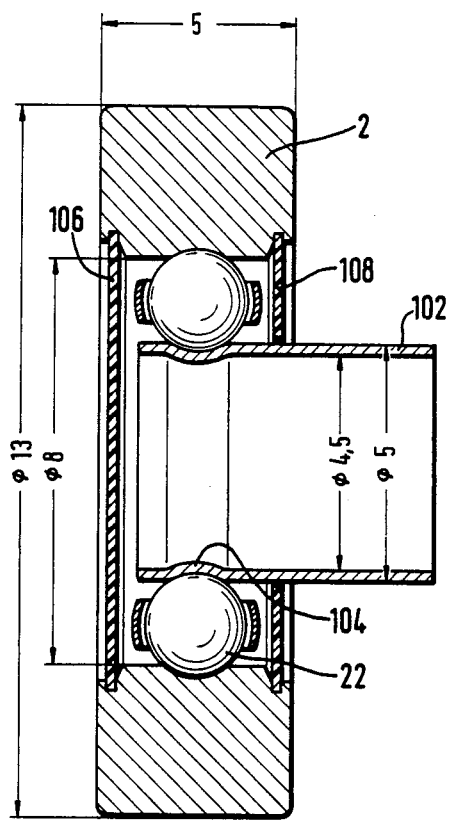
FIG. 31 shows a roller element with hollow guide shaft and sealing plates.

FIG. 31 shows in axial section the annular roller element 2 which is mounted on the thin-walled hollow shaft 102 by means of the roller bodies 22 of the inner roller bearing. The thin-walled hollow shaft 102 likewise forms the above described shaft and extends, as shown, on the right side out of the roller element 2. Corresponding to the initially described embodiments, the projecting end of the hollow shaft 102 is secured in the elastic guide ring, not shown here in further detail. The hollow shaft 102 further forms the inner bearing ring and contains for this purpose an annular groove 104, in which the guide bodies 22 run. A closed front sealing plate 106 and on the other side an annular sealing plate 108 are provided which is responsible for the sealing with respect to the hollow guide shaft 102. In case of a deformation or ovalization of the thick-walled guide element 2 exceeding the bearing gap, a supplemental deformation of the thin-walled hollow guide shaft 102 takes place, whereby only small return forces result on the roller body 22.

Figure 32:
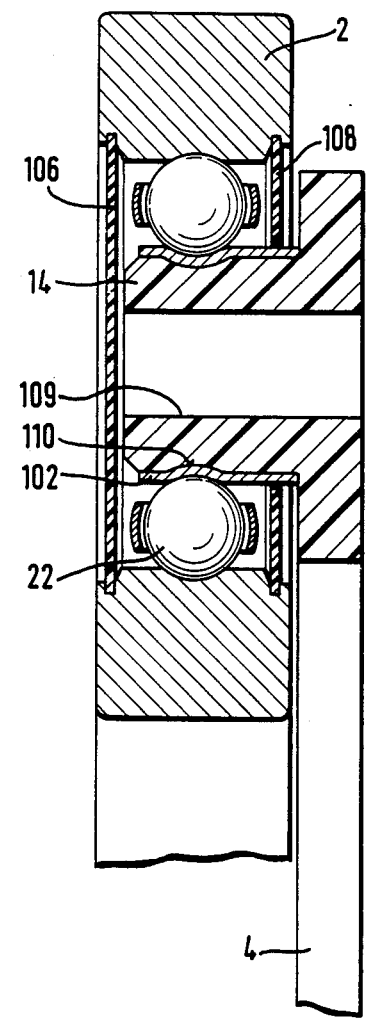
FIG. 32 shows a roller element which is placed on an elastic shaft of a guide ring.

FIG. 32 shows an embodiment similar to FIG. 31, whereby the resiliently elastic guide ring 4 can be seen. The guide ring 4 is composed of an elastically deformable material, particularly a synthetic resin, and has an integral elastic shaft 14 formed thereon with a through opening 109. The axial fixation is effected by a groove form indentation 110 on the shaft 14.

Figure 33:
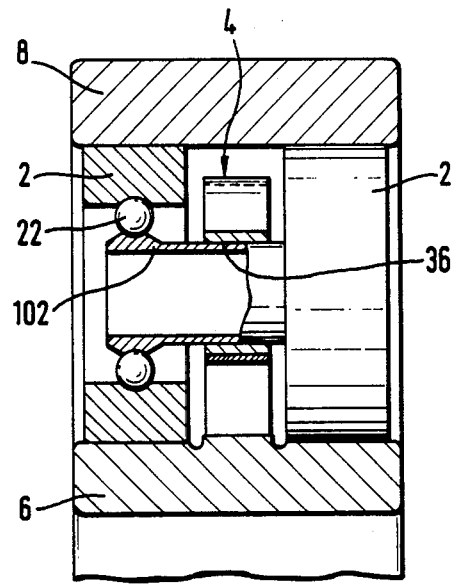
FIG. 33 shows an axial section through a roller bearing with roller elements arranged displaced in the circumferential direction.

FIG. 33 shows an embodiment of the roller bearing with the support- or bearing rings 6, 8. Here two roller elements 2 with parallel axes of rotation can be seen, which are arranged, however, offset in the circumferential direction. The hollow shaft 102 is seated in the bore 36 of the guide ring 4, which is arranged axially between the roller elements 2.

Figure 34:
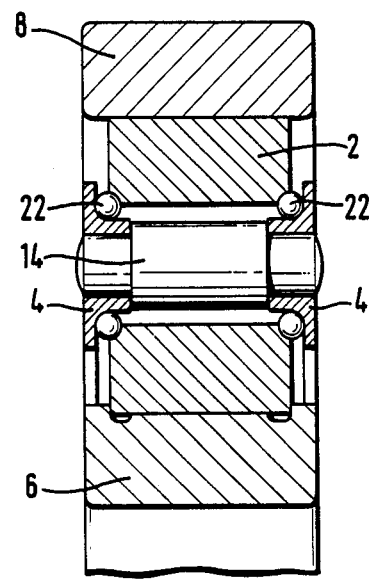
FIG. 34 shows a section through a roller bearing with two-sided mounting and guiding of the roller elements.

FIG. 34 shows a longitudinal section through a roller bearing with a widened roller or roller element, which is mounted by small balls 22 in two guide rings 4 arranged on both sides. The axial and radial mounting takes place through the centrally arranged shaft 14. This embodiment is especially economical to produce since the hollow grooves required to receive the roller bodies 22 are formed in each case by pressing in the support rings 4.

Figure 35:
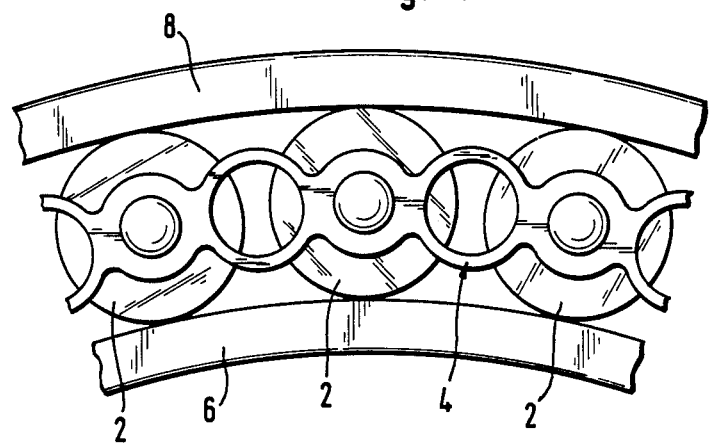
FIG. 35 shows an axial view of the bearing of FIG. 34 with a schematically illustrated resilient guide ring.

FIG. 35 shows schematically an axial view of the roller bearing of FIG. 34. One circumferentially and radially resiliently formed guide ring 4 can be seen clearly.

Figure 36:
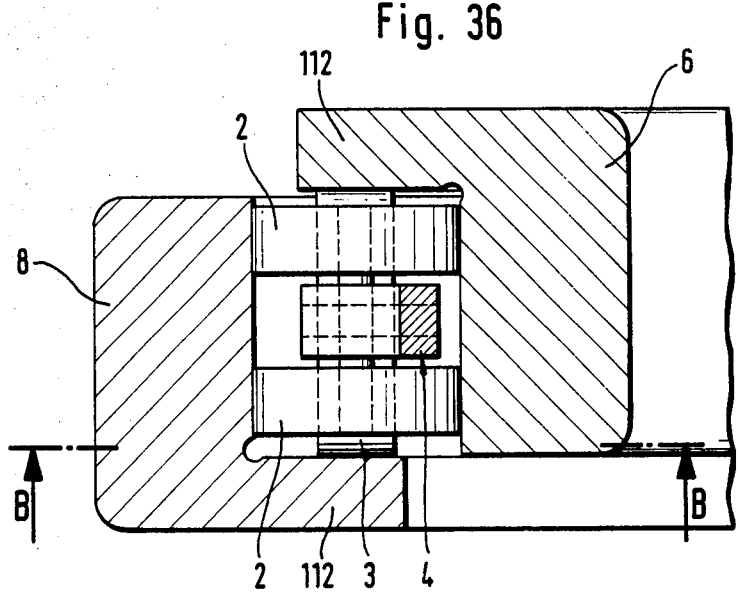
FIG. 36 shows a combined radial-axial bearing.
Figure 37:
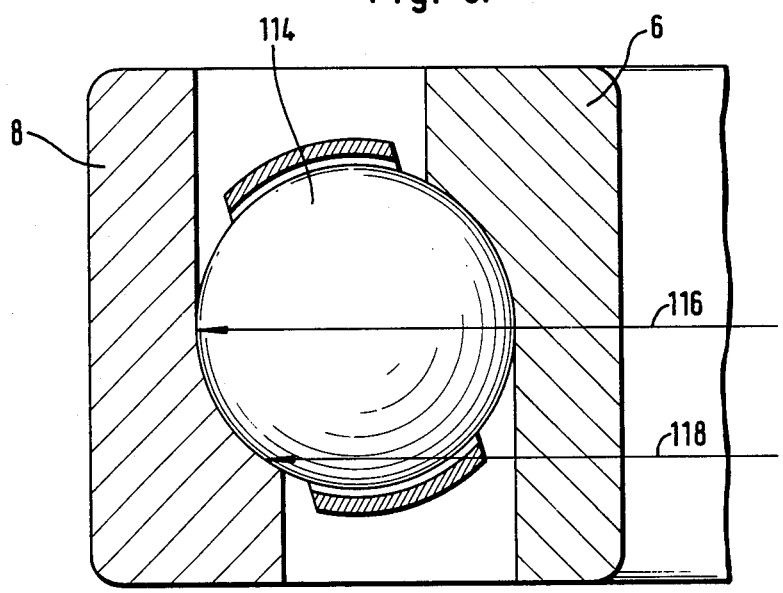
FIG. 37 shows a conventional inclined ball bearing which is replaced by the bearing of the invention according to FIG. 36.

FIG. 36 shows a longitudinal section of an especially important embodiment, namely a combined radial-axial bearing. Between the inner support- and bearing ring 6 as well as the outer support- and bearing ring 8 there are two axially spaced roller elements 2, between which the guide ring 4 is located. These roller elements 2 serve exclusively for radial bearing support. A further roller element 3, which serves for axial bearing support, is shown behind the plane of the drawing. For this purpose the two support rings 6, 8 are provided in accordance with the invention with axial support plates 112, which advantageously are integral components of the support rings 6, 8, but also can be separately fabricated if necessary. Depending on the dominance of the radial or the axial load, the roller elements 2 or 3 can be arranged in pairs, or also individually. In comparison to the conventional tapered ball bearing of series 32, shown in FIG. 37, or a four point bearing, significantly larger radial and axial loads can be reliably transmitted even at high rotational speeds by the combined radial-axial bearing according to the invention. It is known that slippage and frictional losses arise in the balls 114 of the known bearing because of the different diameters 116, 118 of the roller tracks of the outer support ring 8 and correspondingly also of the inner support ring 6, which losses are avoided in the arrangement according to the invention. The roller tracks of the radial roller elements 2 are exactly cylindrical, so that slippage is avoided. As a result of the low rolling resistance, the heat generation of the radial-axial bearing according to the invention is significantly lower than in the known bearing according to FIG. 37. Thus, for example, the coefficient of friction of an inclined ball bearing at a load angle of 45 degrees in which the radial load is the same as the axial load is equal to 0.005, while in the bearing according to the invention a coefficient of friction from 0.001 to 0.0015 is achieved.

Figure 38:
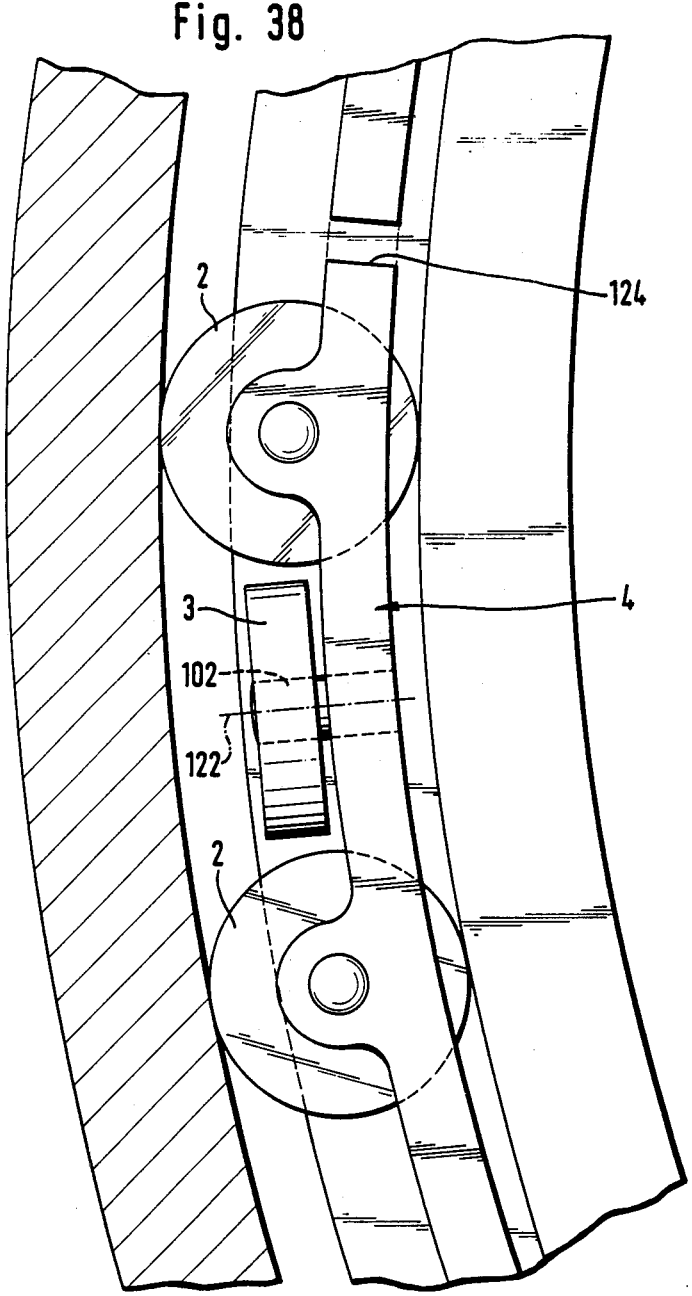
FIG. 38 shows an axial view of the combined bearing of FIG. 36.

FIG. 38 shows a section taken along section line B—B in FIG. 36. In the circumferential direction between the radial roller elements 2 are located the axial roller elements, the axes of rotation 122 of which are each radially oriented. The axial roller elements 3 are also each arranged and attached by a hollow shaft 102 on the guide ring 4 correspondingly to roller elements 2. Due to the radial and axial guidance by means of the roller elements 2 and 3, the guide ring 4 can also be provided with a slit 124. For economical fabrication, the guide ring 4 can be cut from an initially straight band to be subsequently bent in the illustrated manner, whereby the slit 124 is present between the ends of the open guide ring in accordance with the invention.

FIG. 39 shows a further embodiment of a combined radial-axial bearing. The inner support ring 6 is arranged, for example, on a shaft 126, and the outer support ring 8 is arranged in a bearing support 128. The radial roller elements 2 run between the aforesaid support rings 6 and 8. The axial roller elements are located between an axial end face of the outer support ring 8 and the axial support plate 112 attached to the shaft 126 and are secured in each case to guide ring 4 by means of a radially oriented hollow shaft 102.

The foregoing description has been set forth merely to illustrate the invention and is not intended to be limiting. Since modifications of the described embodiments incorporating the spirit and substance of the invention may occur to persons skilled in the art, the scope of the invention should be limited solely with respect to the appended claims and equivalents.

What is claimed is:

1. An arrangement with roller elements which are guided by means of a guide ring and are arranged between two support rings, wherein said roller elements are each rotatably mounted on an associated shaft, said guide ring is resiliently formed in such a way and the shafts are each connected with the guide ring in such a manner that the roller elements can make movements relative to each other, and said roller elements are each annular in form and are each rotatably mounted on the associated shaft by means of an inner rolling body bearing.

2. An arrangement according to claim 1, wherein an inner bearing ring of said inner roller bearing is yieldably formed.

3. An arrangement according to claim 1, wherein said roller elements are annular in form, and wherein the associated shaft of each roller element is yieldably formed.

4. An arrangement according to claim 3, wherein each said shaft is formed as a thin-walled hollow shaft which is connected to said guide ring.

5. An arrangement according to claim 2, wherein said roller elements are deformable up to 1% of their outer diameter when the arrangement is subjected to allowable loads.

6. An arrangement according to claim 2, wherein said guide ring is resiliently elastic and exerts a predetermined radial pressure on the roller elements.

7. An arrangement according to claim 1, wherein said inner roller bearings are individually sealed by means of sealing plates, whereby said shaft is extended through one of said sealing plates.

8. An arrangement according to claim 1, said inner rolling body bearing is arranged radially inwardly of said roller element and is surrounded by said roller element.

9. An arrangement according to claim 1, wherein said inner roller bearing comprises an inner bearing support ring surrounding said associated shaft.

10. An arrangement according to claim 1, wherein said inner roller bearing is a combined axial and radial bearing.

11. An arrangement with roller elements which are guided by means of a guide ring and are arranged between two support rings, wherein said roller elements are each rotatably mounted on an associated shaft, said guide ring is resiliently formed in such a way and the shafts are each connected with the guide ring in such a manner that the roller elements can make movements relative to each other, and said roller elements are rotatably connected by the shafts to the guide ring and are secured against movement longitudinally along their axes of rotation so that frictional contact is avoided between the roller elements and the guide ring.

12. An arrangement according to claim 11, wherein said guide ring is arranged laterally of the roller elements outside of the bearing region.

13. An arrangement according to claim 11, wherein adjacent roller elements are circumferentially spaced apart a distance which is smaller than the diameter of the roller elements.

14. An arrangement according to claim 11, wherein said support rings comprise an inner support ring and an outer support ring and said inner support ring comprises a radially outwardly projecting portion having an axial face which serves as a guide surface for said roller elements.

15. An arrangement with roller elements which are guided by means of a guide ring and are arranged between two support rings, wherein said roller elements are each rotatably mounted on an associated shaft, said guide ring is resiliently formed in such a way and the shafts are each connected with the guide ring in such a manner that the roller elements can make movements relative to each other, and said shafts are secured by a press fit in bores in the guide ring.

16. An arrangement with roller elements which are guided by means of a guide ring and are arranged between two support rings, wherein said roller elements are each rotatably mounted on an associated shaft, said guide ring is resiliently formed in such a way and the shafts are each connected with the guide ring in such a manner that the roller elements can make movements relative to each other, and said shafts are secured under tension in bores or sockets in the guide ring so that they cannot rotate.

17. An arrangement according to claim 16, wherein said guide ring is formed of an elastically resilient material.

18. An arrangement according to claim 16, wherein said roller elements, said guide ring and said shafts are secured in position with respect to each other in the axial direction.

19. An arrangement according to claim 16, wherein said support rings comprise an inner support ring and an outer support ring and there is a radial space between the inner support ring and said guide ring, and wherein said inner support ring comprises a central bore coaxial with said guide ring.

20. An arrangement with roller elements which are guided by means of a guide ring and are arranged between two support rings, wherein said roller elements are each rotatably mounted on an associated shaft, said guide ring is resiliently formed in such a way and the shafts are each connected with the guide ring in such a manner that the roller elements can make movements relative to each other, and the roller elements are arranged in pairs on said shafts.

* * * * *